(12) United States Patent
Ponnamreddy et al.

(10) Patent No.: US 10,932,315 B2
(45) Date of Patent: Feb. 23, 2021

(54) METHODS AND SYSTEMS FOR HANDLING CALL ESTABLISHMENT BY USER EQUIPMENT IN WIRELESS COMMUNICATION NETWORK

(71) Applicant: Samsung Electronics Co., Ltd., Suwon-si (KR)

(72) Inventors: Goutham Ponnamreddy, Bangalore (IN); Umasankar Ceendhralu Baskar, Bangalore (IN); Naga Sreenivas Pydimarri, Bangalore (IN); Pavan Kumar Devarayanigari, Bangalore (IN); Diwakar Sharma, Bangalore (IN)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/290,003

(22) Filed: Mar. 1, 2019

(65) Prior Publication Data
US 2020/0146087 A1    May 7, 2020

(30) Foreign Application Priority Data
Nov. 6, 2018    (IN) .............................. 201841042013

(51) Int. Cl.
*H04W 4/00*    (2018.01)
*H04W 76/18*    (2018.01)
*H04W 36/00*    (2009.01)
*H04W 76/30*    (2018.01)

(52) U.S. Cl.
CPC ....... *H04W 76/18* (2018.02); *H04W 36/0033* (2013.01); *H04W 36/00837* (2018.08); *H04W 76/30* (2018.02)

(58) Field of Classification Search
CPC . H04W 76/18; H04W 36/0033; H04W 76/30; H04W 36/00837
USPC .................................................... 370/329, 330
See application file for complete search history.

(56) References Cited

U.S. PATENT DOCUMENTS

| 8,885,517 | B2 | 11/2014 | Deivasigamani et al. |
| 2011/0105141 | A1* | 5/2011 | Jung ..................... H04W 68/00 455/453 |
| 2012/0213197 | A1* | 8/2012 | Niemi ............... H04W 36/0022 370/331 |
| 2013/0121308 | A1* | 5/2013 | Dhingra ................ H04W 36/08 370/331 |
| 2015/0382250 | A1* | 12/2015 | Speks ................. H04L 65/1016 455/436 |

(Continued)

FOREIGN PATENT DOCUMENTS

WO    WO-2013/122741 A1    8/2013

*Primary Examiner* — Chuong T Ho
(74) *Attorney, Agent, or Firm* — Harness, Dickey & Pierce, P.L.C.

(57) ABSTRACT

A method performed by a user equipment (UE) for establishing a call in a wireless communication network, the method includes determining a first call control (CC) state of the UE after a recovery procedure for a call establishment is performed, sending a CC status enquiry message to a first base station connected to a first network, determining a second CC state of the first base station from a CC status message received from the first base station in response to the CC status enquiry message, and establishing the call by updating the first CC state based on the determined second CC state.

17 Claims, 12 Drawing Sheets

(56) References Cited

U.S. PATENT DOCUMENTS

2015/0382251 A1* 12/2015 Wang ................ H04W 36/0022
455/439
2018/0070402 A1* 3/2018 Chinthalapudi .... H04L 65/1016
2018/0076882 A1* 3/2018 Prakash .................... H04J 3/12

* cited by examiner

METHODS AND SYSTEMS FOR HANDLING CALL ESTABLISHMENT BY USER EQUIPMENT IN WIRELESS COMMUNICATION NETWORK

CROSS-REFERENCE TO RELATED APPLICATION

This U.S. nonprovisional application claims priority under 35 U.S.C § 119 to Indian Patent Application No. 201841042013 filed on Nov. 6, 2018 in the Indian Patent Office, the entire contents of which are hereby incorporated by reference.

TECHNICAL FIELD

The present disclosure relates to a wireless communication network, and is more specifically related to methods and systems for handling call establishment by a User Equipment (UE) in a wireless communication network.

BACKGROUND

For initiating a call or sending a message, there are certain defined messages specified by $3^{rd}$ Generation Partnership Project (3GPP) specifications. During the call, or when sending the message, there are certain cases where a transmission sent either by the UE or a network (e.g., a base station) may not be received by an intended recipient (e.g., a transmission sent by the UE is not received by the network or a transmission sent by the network is not received by the UE) due to various reasons (e.g., the UE is in an out of synchronization (OOS) state, due to a handover, or the like). In this scenario, a deadlock situation occurs in which each entity (e.g., the UE and the network) is waiting for a response from the other entity (e.g., the network waits for the transmission from the UE and the UE waits for the transmission from the network). In 3GPP, defined timers are used to recover from the deadlock scenario based upon a timer expiry.

But there are certain disadvantages of being in the deadlock scenario until a defined timer has expired. During the deadlock, excessive radio resources are consumed until the timer expires and user experience worsens due to delay when the UE and the network are in the deadlock scenario.

Thus, it is desired to address the above mentioned disadvantages or other shortcomings or at least provide a useful alternative.

SUMMARY

Accordingly, some example embodiments herein provide a performed by a user equipment (UE) for establishing a call in a wireless communication network. The method includes determining a first call control (CC) state of the UE after a recovery procedure for a call establishment is performed, sending a CC status enquiry message to a first base station connected to a first network, determining a second CC state of the first base station from a CC status message received from the first base station in response to the CC status enquiry message, and establishing the call by updating the first CC state based on the determined second CC state.

In some example embodiments, the establishing the call comprises sending a CC connect acknowledgement (ACK) message to the first base station.

In some example embodiments, the sending sends the CC status enquiry message to the first base station after a defined time interval.

In some example embodiments, the method further includes determining that a mismatch occurs between the first CC state and the second CC state based on the CC status message, and releasing a radio resource in response to the determining that the mismatch occurs.

In some example embodiments, the method further includes receiving a handover command message from a second base station after sending a connect message to the second base station for establishment of the call while connected to a second network via the second base station, and sending a handover complete message to the first base station after performing a handover, wherein the sending the CC status enquiry message sends the CC status enquiry message to the first base station after a defined time interval.

In some example embodiments, receiving a Single Radio Voice Call Continuity (SRVCC) handover command message from a second base station during establishment of a Voice over Long Term Evolution (VoLTE) call, and sending a SRVCC handover complete message to the first base station after performing a handover, wherein the sending the CC status enquiry message sends the CC status enquiry message to the first base station after a defined time interval.

Some example embodiments herein disclose a user equipment (UE) for establishing a call in a wireless communication network. The UE includes a memory storing computer-readable instructions, and at least one processor coupled to the memory and configured to execute the computer-readable instructions to, determine a first call control (CC) state of the UE after a recovery procedure for a call establishment is performed, send a CC status enquiry message to a first base station connected to a first network, determine a second CC state of the first base station from a CC status message received from the first base station in response to the CC status enquiry message, and establish the call by updating the first CC state based on the determined second CC state.

These and other aspects of some example embodiments herein will be better appreciated and understood when considered in conjunction with the following description and the accompanying drawings. It should be understood, however, that the following descriptions, while indicating some example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF FIGURES

This method is illustrated in the accompanying drawings, throughout which like reference letters indicate corresponding parts in the various figures. Some example embodiments herein will be better understood from the following description with reference to the drawings, in which.

DETAILED DESCRIPTION

Figure 1A:
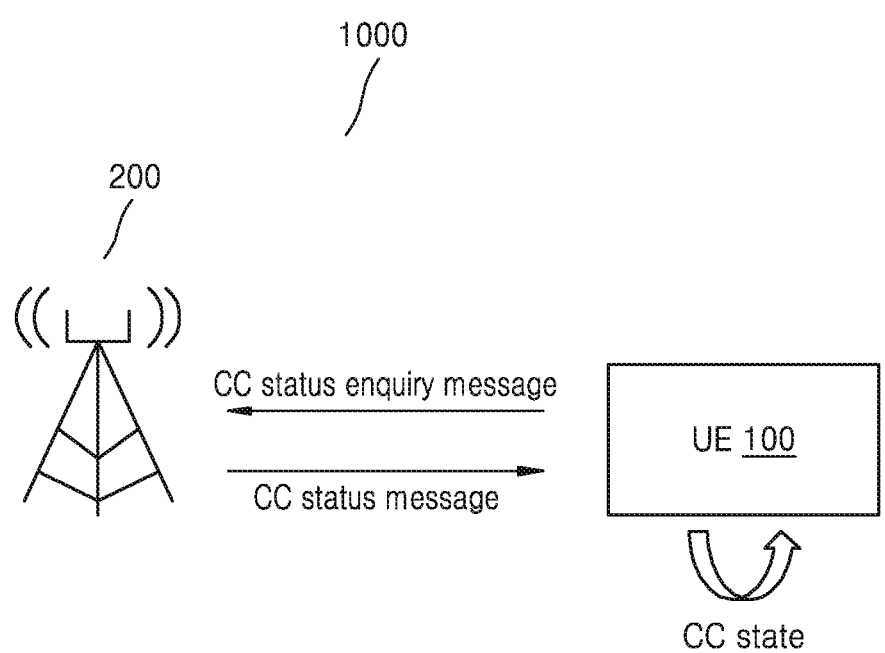
FIG. 1a is an overview of a wireless communication network for handling call establishment, according to some example embodiments as disclosed herein.

Some example embodiments herein and the various features and advantageous details thereof are explained more fully with reference to the non-limiting example embodiments that are illustrated in the accompanying drawings and detailed in the following description. Descriptions of well-known components and processing techniques are omitted so as to not unnecessarily obscure the example embodiments herein. Also, the various example embodiments described herein are not necessarily mutually exclusive, as some example embodiments can be combined with one or more other example embodiments to form new example embodiments. The term "or" as used herein, refers to a non-exclusive or, unless otherwise indicated. The examples used herein are intended merely to facilitate an understanding of ways in which some example embodiments herein can be practiced and to further enable those skilled in the art to practice the example embodiments herein. Accordingly, the examples should not be construed as limiting the scope of the example embodiments herein.

As is traditional in the field, some example embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits, or the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by at least one processor (e.g., one or more programmed microprocessors and associated circuitry), or by a combination of dedicated hardware to perform some functions of the blocks and a processor to perform other functions of the blocks. Each block of some example embodiments may be physically separated into two or more interacting and discrete blocks without departing from the scope of the example embodiments. Likewise, the blocks of some example embodiments may be physically combined into more complex blocks without departing from the scope of the example embodiments.

The accompanying drawings are used to help easily understand various technical features and it should be understood that some example embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Some example embodiments herein provide methods and systems for handling a call establishment by a UE in a wireless communication network.

Some example embodiments herein include determining that a CC state of the UE matching with a CC state of a network after a recovery procedure.

Some example embodiments herein include sending a CC status enquiry message to the network for obtaining the CC state of the network.

Some example embodiments herein include sending a CC status enquiry message to the network after expiry of a defined time interval at the UE.

Some example embodiments include managing a radio resource by releasing the radio resource assigned to the UE after determining that the CC state of the UE does not match with the CC state of the network.

Some example embodiments herein include establishing the call after determining that the CC state of the UE match with the CC state of the network.

Accordingly, some example embodiments herein provide a UE for handling call establishment in a wireless communication network. The UE includes a call establishment controller coupled to a memory and at least one processor. The call establishment controller is configured to detect a CC state of the UE after a recovery procedure for a call establishment. Further, the call establishment controller is configured to transmit a CC status enquiry message to the network for obtaining a CC state of the network. Further, the call establishment controller is configured to determine the CC state of the network from a CC status message received from the network in response to the CC status enquiry message. Further, the call establishment controller is configured to establish the call by updating the CC state of the UE based on the determined CC state of the network.

Unlike conventional methods and systems, the proposed method may be used to conserve the radio resources by releasing the call early instead of waiting for the timer (e.g., NAS T310/T303) to expire. Accordingly, instead of the user of the UE 100 remaining in a dialing state, the network 200 releases the resources corresponding to the call, notifying the user of the UE 100 that the call is not connected, providing the user with the opportunity to redial the call. Therefore, the user's experience is improved by reducing delay in completing the call.

Unlike conventional methods and system, the method may also be used to improve a call success rate (CSR) and utilizes the radio resources during a deadlock scenario between the UE and the network in a more efficient manner. This results in improving the better user experience by reducing delay in completing the call.

Unlike conventional methods and system, when the deadlock scenario is detected, the UE changes its CC state to the CC state that is expected by the network (e.g., matches the CC state of the network) so as effectively utilize the radio resources.

Unlike conventional methods and system, with the confirmation of the CC state change at the network side, the UE will change the UE CC state to be compatible with the network CC state, so as to avoid the deadlock scenario, to effectively utilize the radio resources.

Referring now to the drawings, and more particularly to FIGS. 1a through 11, there are shown some example embodiments.

FIG. 1a is an overview of a wireless communication network 1000 for handling call establishment, according to some example embodiments as disclosed herein. The wireless communication network 1000 includes a UE 100 and a base station 200. The UE 100 may be, for example, but is not limited to a cellular phone, a smart phone, a Personal Digital Assistant (PDA), a wireless modem, a tablet computer, a laptop computer, or the like. The UE 100 may also be referred to by those skilled in the art as a mobile station, a subscriber station, a mobile unit, a subscriber unit, a wireless unit, a remote unit, a mobile device, a wireless device, a wireless communications device, a mobile subscriber station, an access terminal, a mobile terminal, a wireless terminal, a remote terminal, a handset, a user agent, a mobile client, or the like. The base station 200 may also be referred to by those skilled in the art as a Node B, an evolved-Node B (eNB), a sector, a site, a Base Transceiver System (BTS), an Access Point (AP), a relay node, a Remote Radio Head (RRH), a Radio Unit (RU), and/or a small cell.

The UE 100 may be compliant with multiple, different communication protocols, enabling the UE 100 to operate as a multi-mode device by communicating within a 5th Generation (5G) network, a 4$^{th}$ Generation (4G) network employing any common type of LTE or LTE-Advanced (LTE-A) radio access technology (RAT), a 3G network and/or a 2G network. The base station 200 may be connected to a corresponding network, such as a 5G network, a 4G network, a network employing LTE or LTE-A RAT, a 3G network and/or a 2G network. By communicating with the base station 200, the UE 100 is able to connect to the corresponding network via the base station 200. Accordingly, the base station 200 is also referred to as "the network 200," "the first network 200a" and/or "the second network 200b" herein.

Consider, for example, that a radio resource is managed by the UE 100 in the wireless communication network 1000, when the UE is in the OOS state. In some example embodiments, the UE 100 is configured to detect a CC state of the UE 100 after a recovery procedure for the call establishment. After the recovery procedure for the call establishment, the UE 100 is configured to transmit a CC status enquiry message to the network 200 for obtaining a CC state of the network 200.

In response to the CC status enquiry message, the UE 100 is configured to determine the CC state of the network 200 from a CC status message received from the network 200. Based on the determination, the UE 100 is configured to establish a call by updating the CC state of the UE based on the determined CC state of the network 200.

In some example embodiments, the wireless communication network may be a 3$^{rd}$ Generation (3G) network 200, and the UE 100 is a Mobile Originated (MO) UE that initiates a call to a Mobile Terminated (MT) UE. During the MO call setup time, after a radio bearer setup is completed, the UE CC state is in a CC_CALL_DELIVERED state and a network CC state is in a CC_CALL_DELIVERED state. The network 200 sends a CC CONNECT message to the UE 100. The network 200 starts a timer (e.g., CC_T313 for 30 seconds). The UE 100 moves to an Out of synchronization/Out of Service (OOS) state and a NAS T310/T303 timer is started at the UE 100. The UE 100 is unable to receive the CC CONNECT message due to the OOS.

Further, the UE 100 sends a cell update message (e.g., Cell Update: rl-failure message) to the network 200. Based on the cell update message, the network 200 sends the cell update confirm message (e.g., SI:Cell_DCH) to the UE 100.

Since the network 200 (e.g., the mobile switching center (MSC)) has triggered a CC CONNECT message, the CC state at the network 200 changes to a CC_CONNECT_INDICATION state from the CC_CALL_DELIVERED state and a timer CC_T313 (e.g., of 30 second duration) at the network 200 starts. The UE 100 and the network 200 both wait for each other to respond (e.g., UE 100 waits for a connect message from the network 200, and the network 200 waits for a CONNECT ACK message from the UE 100, to proceed further).

In conventional methods and systems, after the recovery from the OOS, the UE 100 is in a back in service and waiting for a call control (CC) connect message state. When a timer (e.g., NAS T310 timer) expires without the UE 100 having received the CC connect message from the network 200, the UE 100 sends a disconnect message to the network 200. Based on the disconnect message, the call setup fails and the radio resources corresponding to the call will be released after the timer expiry either at the network 200 or at the UE 100. This results in a negative user experience due to excessive delay in waiting for the call to be connected, and excessive wastage of the radio resources.

However, according to some example embodiments, after recovery from the OOS (e.g., the UE 100 may initiate a recovery procedure following the expiration of a timer at the UE 100), the UE 100 may send a status enquiry message to determine the network's CC state. According to some example embodiments, the below conditions may be used by the UE 100 for determining when to trigger the status enquiry message:

1. UE 100 CC state: CC_CALL_DELIVERED,
2. Radio Bearer Resources are allocated, and
3. Recovery from the OOS with a Radio Resource Control (RRC) state of CELL_DCH, and circuit switched (CS) bearers are not released.

Based on the cell update confirm message, the UE 100 sends the CC status enquiry to the network 200. The network 200 sends the network 200 CC status (e.g., CC_connect indication Cause: Response to status Enquiry) to the UE 100. Based on the network 200 CC status, the UE 100 sends the resource release complete message to the network 200 (e.g., if the network's CC_STATE is CC_CONNECT_INDICATION which confirms that the network 200 sent the CONNECT message to the UE 100, then the UE 100 sends the RELEASE COMPLETE message with the CC Cause: temporary failure to the network).

Accordingly, the UE 100 may conserve the radio resources by releasing the call early instead of waiting for the timer (e.g., NAS T310/T303) to expire. Accordingly, instead of the user of the UE 100 remaining in a dialing state, the network 200 releases the resources corresponding to the call, notifying the user of the UE 100 that the call is not connected, providing the user with the opportunity to redial the call. Therefore, the user's experience is improved by reducing delay in completing the call. In case of a Dual Subscriber Identity Module (SIM) Dual Stand-by (DSDS) UE, a stack other than the stack attempting to perform he call may use radio frequency (RF) resources after the call is released without the additional delay of waiting for the timer to expire.

In some example embodiments, if the network 200 CC_STATE corresponds to the CC_CONNECT_INDICATION, the UE 100 determines that the network 200 sent the CONNECT message to the UE 100, and thus, the UE 100 CC state (e.g., CC_CALL_DELIVERED) does not match the network 200 CC state (e.g., CC_CONNECT_INDICATION). With the confirmation of the CC state change at the network 200, the UE 100 will change the UE 100 CC state to be compatible with (e.g., match) the network 200 CC state. In accordance with the changed UE 100 CC state, the UE 100 sends the CC_CONNECT_ACK message to the network 200.

In some example embodiments, if the network 200 CC_STATE corresponds to a CC_DISCONNECT_INDICATION state, the UE 100 determines that the network 200 sent a DISCONNECT message to the UE 100, and thus, the UE 100 CC state (e.g., CC_CALL_DELIVERED) does not match the network 200 CC state (e.g., CC_DISCONNECT_INDICATION). Accordingly, the UE 100 will change the UE 100 CC state to be compatible with (e.g., match) the CC state of the network 200. In accordance with the changed UE 100 CC state, the UE 100 sends a RELEASE COMPLETE message to the network 200. According to some example embodiments, similarly appropriate action will be taken as per 3GPP specifications, if there is any CC state mismatch between the UE 100 and the network 200.

Consider, for example, that the UE 100 CC state is in the CC_CALL_DELIVERED state and the network 200 CC state is in the CC_CALL_DELIVERED state. The network 200 sends the CC connect message to the UE 100 and the network 200 starts the timer (e.g., CC_T313 for 30 seconds). The UE 100 does not receive the CC connect message due to any reason (e.g.,OOS, or the like) and the UE 100 starts an internal timer for a threshold value (e.g., the threshold value is 8 seconds). The status enquiry will be triggered by the UE 100 upon expiry of the timer. The UE 100 sends the CC status enquiry message to the network 200. The network 200 sends the CC status (e.g., CC_Connect indication Cause: Response to status Enquiry) to the UE 100. Based on the CC status, the UE 100 performs the action. The action corresponds to the releasing the radio resource or establishing the call.

In some example embodiments, the UE 100 waits for the threshold value (defined by the user) before sending the status enquiry message to the network 200. Based on the network's CC state, the UE 100 proceeds with the action. The action corresponds to the releasing the radio resource or establishing the call.

In some example embodiments, if the network 200 CC_STATE corresponds to a CALL_DELIVERED state, the UE 100 will not perform any actions and waits for the CONNECT message, because UE 100 CC state is the same as the network 200 CC state.

Figure 1B:
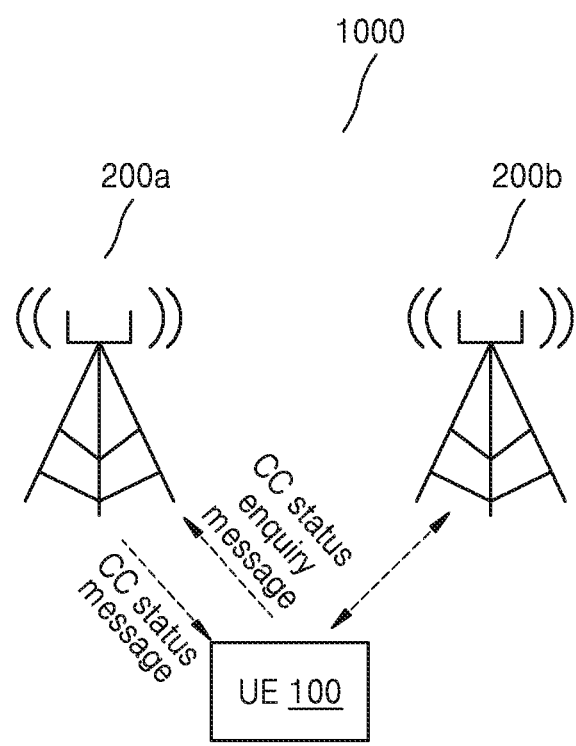
FIG. 1b is an overview of a wireless communication network in which a radio resource is managed during a handover, according to some example embodiments as disclosed herein.

FIG. 1b is an overview of the wireless communication network in which radio resources are managed during a handover, according to some example embodiments as disclosed herein.

In this scenario, the UE 100 is moved from a 3G network (e.g., network 200b) to a 2G network (network 200a) due to a handover. In some example embodiments, an RRC connection is established and a paging response sent from the UE 100 to a second network 200b (e.g., 3G network). The second network 200b sends a call setup message to the UE 100. The UE 100 sends a call confirmed message to the second network 200b. The UE 100 sends a call connect message to the second network 200b. At this juncture, the UE 100 is in a CC_CONNECT_REQUEST state. The second network 200b sends a handoverFromUTRANCommand-GSM to the UE 100. The UE 100 sends the handover complete message to the first network 200a.

In conventional methods and systems, if a connect acknowledgement message is sent to the UE 100 by the second network 200b during the handover from the second network 200b to the first network 200a, the call setup will fail and the radio resources corresponding to the call will be released after the timer expiry either at the network 200 or at the UE 100. This results in a negative user experience due to excessive delay in waiting for the call to be connected, and excessive wastage of the radio resources.

However, according to some example embodiments, after sending the handover complete message to the first network 200a, the UE 100 starts an internal timer (duration defined by a user, e.g., 8 seconds) and after expiry of the timer, the UE 100 sends a CC status enquiry message to the first network 200a. The first network 200a sends the CC status message (e.g., CC_Connect indication Cause: Response to status Enquiry) to the UE 100. Based on the CC status message, the UE 100 responds as if a connect acknowledgement message were received from the second network 200b.

In some example embodiments, when the connect acknowledgement message is missed at the UE 100 due to the handover from 3G network to 2G network, after the connect message is sent to the second network 200b, the UE 100 will start the timer with the threshold value (in an example, the threshold value is 8 seconds). Upon the expiry of the timer, the UE 100 will send a STATUS ENQUIRY message to the 2G network (e.g., the first network 200a). The 2G network responds with STATUS message with the CC state as ACTIVE state. Further, if the CC STATE at the network side is the CC_ACTIVE state and the UE 100 CC state is CC_CONNECT_REQUEST, the UE 100 responds as if the missed CONNECT ACKNOWLEDGE message were received from the second network 200b.

Referring back to FIG. 1a, in some example embodiments, the UE 100 may be involved a SRVCC Handover from an LTE network to a 3G/2G network. The network 200 sends a VoLTE call message to a UE LTE protocol stack. The UE LTE protocol stack sends the incoming call VoLTE call notification message to a user interface (UI) application. The user interface application sends a call accepted message to the UE LTE protocol stack. The UE LTE protocol stack sends a message (e.g., a 200 ok message) to the network 200. The network 200 sends a SRVCC handover (HO) command to the UE LTE protocol stack.

In conventional methods and systems, after the network 200 sends the SRVCC HO commend to the UE LTE protocol stack, the UE LTE protocol stack sends a "call context transfer to CC with an alerting state" message to a UE 2G/3G protocol stack. The network 200 sends an acknowledgement message, but the UE 100 does not receive the acknowledgement message due to the HO procedure. Then, the UE 2G/3G protocol stack sends the SRVCC HO complete message to the network 200. At this juncture, the UE 100 CC state is in an alerting state and the network 200 CC state is an active state. But, in the network 200, after the UE 100 sends the SRVCC HO complete message, a Proxy-Call Session Control Function (P-CSCF) entity provides a MO call context to a Mobile Switching Centre (MSC) (e.g., the network 200) with the CC CONNECT state, resulting in a call context mismatch between the UE 100 and the network 200. Since the UE 100 does not receive the acknowledgement message, the call setup will fail and the resource corresponding to the call will be released after the timer expiry either at the network 200 or at the UE 100. This results in a negative user experience due to excessive delay in waiting for the call to be connected, and excessive wastage of the radio resources.

However, in some example embodiments, the UE LTE protocol stack sends a call context transfer message including CC with connect request state to a UE 2G/3G protocol stack. The UE 2G/3G protocol stack sends a SRVCC HO complete message to the network. The UE 2G/3G protocol stack starts an internal timer of a specified duration (e.g., 8 seconds as a threshold value) and the UE 2G/3G protocol stack sends the CC status enquiry message to the network 200. The network 200 sends the CC status message (e.g., CC_Connect indication Cause: Response to status Enquiry) to the UE 100. Based on the CC status message, the UE 100 responds as if the connect acknowledgement were received from the network 200.

In some example embodiments, the UE 100 will start the timer for the threshold value (e.g., 8 seconds), and once the timer expires, the UE 100 will request the CC state of the network 200. The UE 100 sends the status enquiry message to the 2G/3G network 200. The network 200 responds with the STATUS message with CC state as ACTIVE. In this case, if the CC STATE at the network 200 is CC_ACTIVE and the UE 100 if it is CC_CONNECT_REQUEST (indicating that the UE 100 is still at an alerting phase) then the UE 100 responds as if the connect acknowledge message were received from the network 200.

Although the FIGS. 1a and 1b show overview of the wireless communication network 1000 but it is to be understood that some example embodiments are not limited thereon. In some example embodiments, the wireless communication network 1000 may include less or more components. Further, the labels or names of the components are used only for illustrative purpose and does not limit the scope of the example embodiments.

Figure 2:
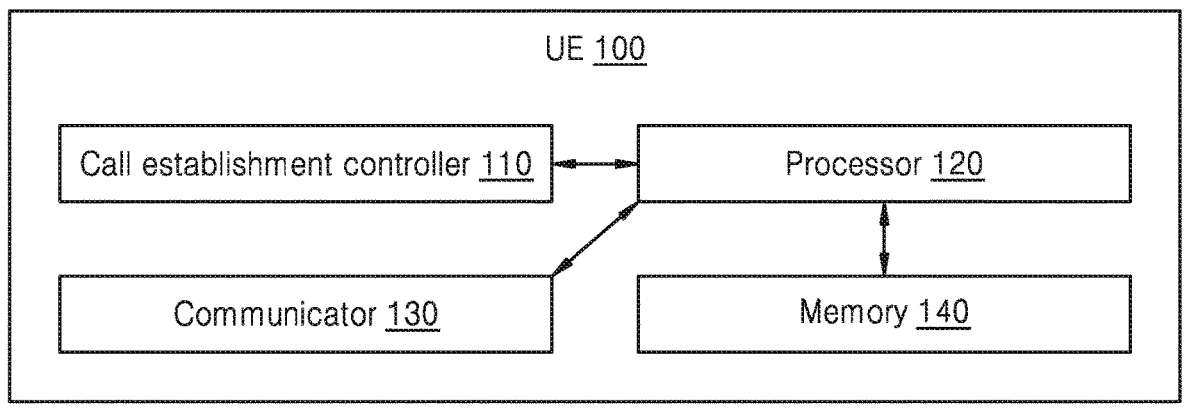
FIG. 2 is a block diagram of a UE for handling call establishment, according to some example embodiments as disclosed herein.

FIG. 2 is a block diagram of the UE 100, according to some example embodiments as disclosed herein. In some example embodiments, the UE 100 includes a call establishment controller 110, at least one processor 120, a communicator 130, and a memory 140. Operations described herein as being performed by any or all of the call establishment controller 110 and the UE 100 may be performed by at least one processor (e.g., the at least one processor 120) executing program code that includes instructions corresponding to the operations. The instructions may be stored in a memory of the UE 100 (e.g., the memory 140). The term 'processor,' as used in the present disclosure, may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor; a multiprocessor, an application-specific integrated circuit (ASIC), and a field programmable gate array (FPGA).

Consider a first scenario in which a radio resource is managed by the UE 100 in the wireless communication network 1000 and the UE is in the OOS state. In some example embodiments, the call establishment controller 110 is configured to detect the CC state of the UE 100 after the recovery procedure for the call establishment. After the recovery procedure for the call establishment, the call establishment controller 110 is configured to transmit the CC status enquiry message to the network 200 for obtaining the CC state of the network 200.

In response to the CC status enquiry message, the call establishment controller 110 is configured to determine the CC state of the network 200 from the CC status message received from the network 200. Based on the determination, the call establishment controller 110 is configured to establish the call by updating the CC state with the determined CC state of the network 200.

Consider a second scenario in which the radio resource is managed by the UE 100 in the wireless communication network 1000, the UE 100 performs the handover from the first network 200a to the second network 200b, and the UE 100 is in the OOS state/HO procedure state. In some example embodiments, the call establishment controller 110 is configured to transmit the handover complete message after performing handover to the second network 200b from the first network 200a. Further, the call establishment controller 110 is configured to transmit the CC status enquiry message to the second network 200b for obtaining the CC state of the second network after expiry of the determined time interval at the UE 100. In response to the CC status enquiry message, the call establishment controller 110 is configured to determine the CC state of the second network 200b from the CC status message received from the second network 200b. Further, the call establishment controller 110 is configured to establish the call by updating the CC state of the second network 200b based on the determined CC state of the second network 200.

Consider a third scenario in which the radio resource is managed by the UE 100 in the wireless communication network 1000, the UE 100 performs the SRVCC handover from a LTE domain to a CS domain and the UE 100 is in the OOS state/HO procedure state. In some example embodiments, the call establishment controller 110 is configured to transmit the SRVCC handover complete message after performing handover to the second network 200b from the first network 200a. Further, the call establishment controller 110 is configured to transmit the CC status enquiry message to the network for obtaining the CC state of the second network 200b after expiry of the determined time interval at the UE 100. Further, the call establishment controller 110 is configured to determine the CC state of the second network 200b from the CC status message received from the first network 200a. Further, the call establishment controller 110 is configured to establish the call by updating the CC state of the second network 200b with the determined CC state of the second network 200b.

The at least one processor 120 is configured to execute computer-readable instructions stored in the memory 140. The communicator 130 is configured for communicating internally between internal hardware components and/or with external devices via one or more networks (e.g., the wireless communication network 1000, the network 200, the first network 200a and/or the second network 200b). The communicator 130 is configured for communicating with the call establishment controller 110 to manage the radio resource or establish the call in the wireless communication network 1000. The communicator 130 may be embodied, for example, by circuits or circuitry or, alternatively, at least one processor (e.g., the at least one processor 120) executing program code stored in a memory (e.g., memory 140) including instructions corresponding to any or all operations described herein as being performed by the communicator 130.

The memory 140 stores computer-readable instructions to be executed by the at least one processor 120. The memory 140 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 140 may, in some examples, be considered a non-transitory storage medium. The term "non-transitory" may indicate that the storage medium is not embodied in a carrier wave or a propagated signal. However, the term "non-transitory" should not be interpreted that the memory 140 is non-movable. In some examples, the memory 140 may be configured to store amounts of information in excess of the capacity of the memory 140. For example, a non-transitory storage medium may store data that may, over time, change (e.g., in Random Access Memory (RAM) or cache).

Although the FIG. 2 shows various hardware components of the UE 100, it is to be understood that some example embodiments are not limited thereon. In some example embodiments, the UE 100 may include less or more components. Further, the labels or names of the components are used only for illustrative purposes and do not limit the scope of the example embodiments. One or more components may be combined together to perform same or substantially similar function to manage the radio resource in the wireless communication network 1000.

Figure 3:
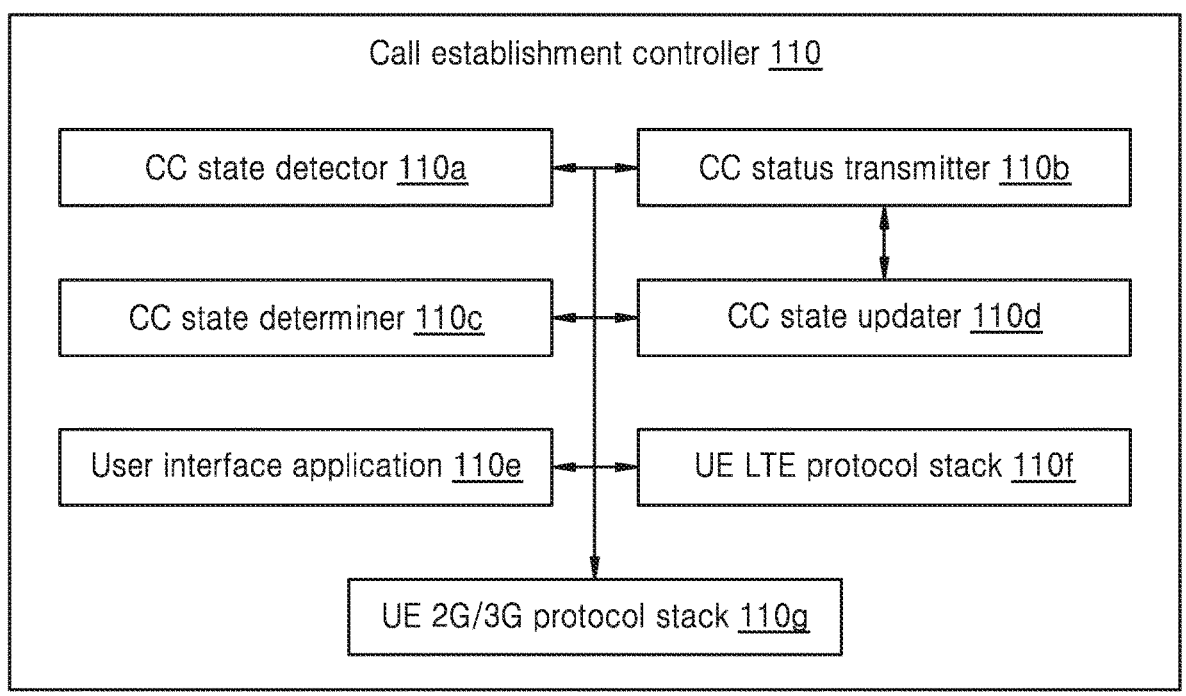
FIG. 3 is a block diagram of a call establishment controller of the UE, according to some example embodiments as disclosed herein.

FIG. 3 is a block diagram of the call establishment controller 110, according to some example embodiments as disclosed herein. In some example embodiments, the call establishment controller 110 includes a CC state detector 110a, a CC status transmitter 110b, a CC state determiner 110c, a CC state updater 110d, a user interface application 110e, a UE LTE protocol stack 110f, and/or a UE 2G/3G protocol stack 110g. Operations described herein as being performed by any or all of the CC state detector 110a, the CC status transmitter 110b, the CC state determiner 110c, the CC state updater 110d, the user interface application 110e, the UE LTE protocol stack 110f, and the UE 2G/3G protocol stack 110g may be performed by at least one processor (e.g., the at least one processor 120) executing program code that includes instructions corresponding to the operations. The instructions may be stored in a memory of the UE 100 (e.g., the memory 140).

Consider the first scenario in which the radio resource is managed by the UE 100 in the wireless communication network 1000 and the UE 100 is in the OOS state. In some example embodiments, the CC state detector 110a detects the CC state of the UE 100 after the recovery procedure for the call establishment. The CC status transmitter 110b transmits the CC status enquiry message to the network 200. The CC state determiner 110c obtains the CC state of the network 200. Further, the CC state determiner 110c determines the CC state of the UE 100 matching with CC state of the network 200.

In some example embodiments, the CC state determiner 110c determines the CC state of the network 200 from the CC status message received from the network 200. Further, the CC state updater 110d updates the CC state with the determined CC state of the network 200. The CC state updater 110d establishes the call.

If the CC state of the UE 100 does not match with CC state of the network 200, then the CC state updater 110d releases the radio resource assigned to the UE 100.

If the CC state of the UE 100 matches with CC state of the network 200, the CC state updater 110d updates the CC state corresponding to the determined CC state of the network 200, and the CC state updater 110d establishes the call.

In some example embodiments, the UE LTE protocol stack 110f receives the VoLTE call message from network 200. The UE LTE protocol stack 110f sends the incoming call VoLTE call notification message to the UI application 110e. The user interface application 110e sends the call accepted message to the UE LTE protocol stack 110f. The UE LTE protocol stack 110f sends a message (e.g., 200 ok) to the network 200. The network 200 sends the SRVCC HO command to the UE LTE protocol stack 110f.

The UE LTE protocol stack 110f sends the Call context transfer message, including the CC with connect request state, to a UE 2G/3G protocol stack 110g. The UE 2G/3G protocol stack 110g sends a SRVCC HO complete message to the network. The UE 2G/3G protocol stack 110g starts the internal timer expiring at a specified time (e.g., 8 seconds, and/or as defined by the user), and the UE 2G/3G protocol stack 110g sends the CC status enquiry message to the network 200. The network 200 sends the CC status message (e.g., CC_Connect indication Cause: Response to status Enquiry) to the UE 100. Based on the CC status message, the UE 100 assumes that the connect acknowledgement is received.

Although the FIG. 3 shows various hardware components of the call establishment controller 110, it is to be understood that some example embodiments are not limited thereon. In some example embodiments, the call establishment controller 110 may include less or more components. Further, the labels or names of the components are used only for illustrative purpose and does not limit the scope of some example embodiments. One or more components may be combined together to perform same or substantially similar function to manage the radio resource or establish the call in the wireless communication network 1000.

Figure 4:
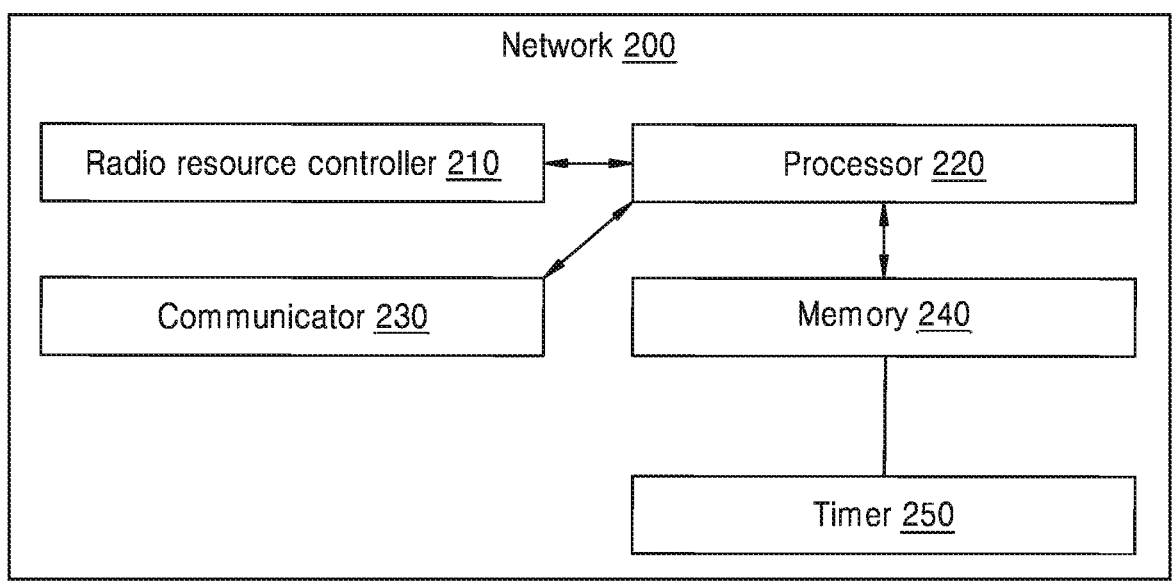
FIG. 4 is a block diagram of a base station (also referred to as a "network" herein), according to some example embodiments as disclosed herein.

FIG. 4 is a block diagram of the base station 200 (also referred to herein as the "network 200" or the "wireless communication network 200"), according to some example embodiments as disclosed herein. In some example embodiments, the network 200 includes a radio resource controller 210, at least one processor 220, a communicator 230, a memory 240 and a timer 250. Operations described herein as being performed by any or all of the radio resource controller 210, the wireless communication network 200 and the timer 250 may be performed by at least one processor (e.g., the at least one processor 220) executing program code that includes instructions corresponding to the operations. The instructions may be stored in a memory of the wireless communication network 200 (e.g., the memory 240). The timer 250 may be a CC_T313 timer of a determined, defined, and/or configurable duration (e.g., 30 seconds).

The radio resource controller 210 receives the CC status enquiry message from the UE 100. Based on the CC status enquiry message, the radio resource controller 210 sends the CC status message of the network 200 to the UE 100. The at least one processor 220 is configured to execute computer-readable instructions stored in the memory 240 and to perform various processes. The communicator 230 is configured for communicating internally between internal hardware components and/or with external devices via one or more networks (e.g., the wireless communication network 1000). The communicator 230 is configured for communicating with the radio resource controller 210 to manage the radio resource or establish the call in the wireless communication network 1000. The communicator 230 may be embodied, for example, by circuits or circuitry or, alternatively, at least one processor (e.g., the at least one processor 220) executing program code stored in a memory (e.g., memory 240) including instructions corresponding to any or all operations described herein as being performed by the communicator 230.

The memory 240 stores computer-readable instructions to be executed by the at least one processor 220. The memory 240 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 240 may, in some examples, be considered a non-transitory storage medium. The term "non-transitory" may indicate that the storage medium is not embodied in a carrier wave or a propagated signal. However, the term "non-transitory" should not be interpreted that the memory 240 is non-movable. In some examples, the memory 240 may be configured to store amounts of information in excess of the capacity of the memory 140. For example, a non-transitory storage medium may store data that may, over time, change (e.g., in Random Access Memory (RAM) or cache).

Although the FIG. 4 shows various hardware components of the network 200, it is to be understood that some example embodiments are not limited thereon. In some example embodiments, the network 200 may include less or more components. Further, the labels or names of the components are used only for illustrative purposes and do not limit the scope of the example embodiments. One or more components may be combined together to perform same or substantially similar function to manage the radio resource or establish the call in the wireless communication network 1000.

Figure 5:
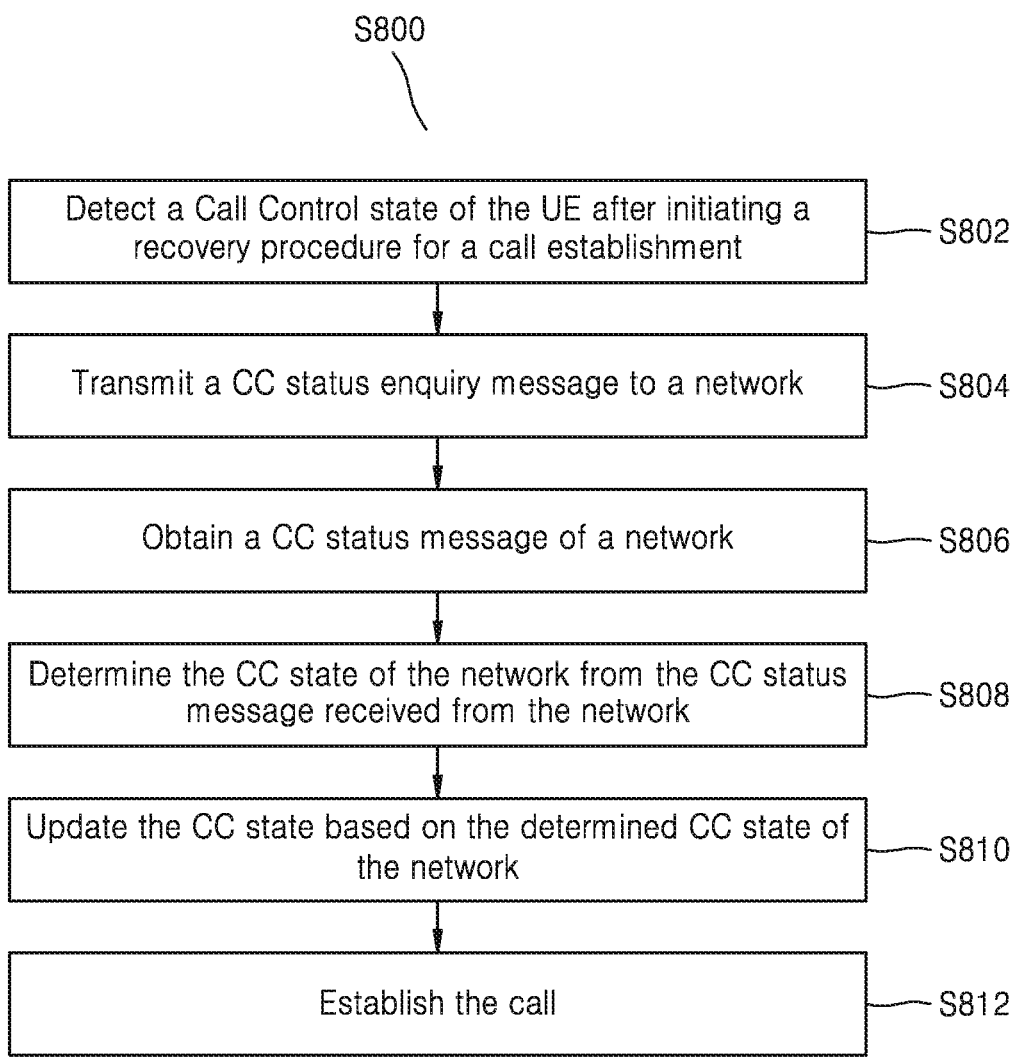
FIG. 5 is a flow diagram illustrating a method for handling call establishment by the UE in the wireless communication network, according to some example embodiments as disclosed herein.

FIG. 5 is a flow diagram illustrating a method for handling call establishment by the UE 100 in the wireless communication network 1000, according to some example embodiments as disclosed herein.

At S802, the method includes detecting (e.g., determining) the CC state of the UE 100 after the recovery procedure for the call establishment. In some example embodiments, the method allows the CC state detector 110a to detect the CC state of the UE 100 after the recovery procedure for the call establishment. At S804, the method includes transmitting (e.g., sending) the CC status enquiry message to the network 200. In some example embodiments, the method allows the CC status transmitter 110b to transmit the CC status enquiry message to the network 200. At S806, the method includes obtaining the CC status message of the network 200. In some example embodiments, the method allows the CC state determiner 110c to obtain the CC status message of the network 200.

At S808, the method includes determining the CC state of the network 200 from the CC status message received from the network 200. In some example embodiments, the method allows the CC state determiner 110c to determine the CC state of the network 200 from the CC status message received from the network 200. At S810, the method includes updating the CC state based on the determined CC state of the network 200. In some example embodiments, the method allows the CC state updater 110d to update the CC state based on the determined CC state of the network 200. At S812, the method includes establishing the call. In some example embodiments, the method allows the CC state updater 110d to establish the call.

The various actions, acts, blocks, operations, or the like in the flow diagram S800 may be performed in the order presented, in a different order or contemporaneously. Further, in some example embodiments, some of the actions, acts, blocks, operations, or the like may be omitted, added, modified, skipped, or the like without departing from the scope of the example embodiments.

Figure 6:
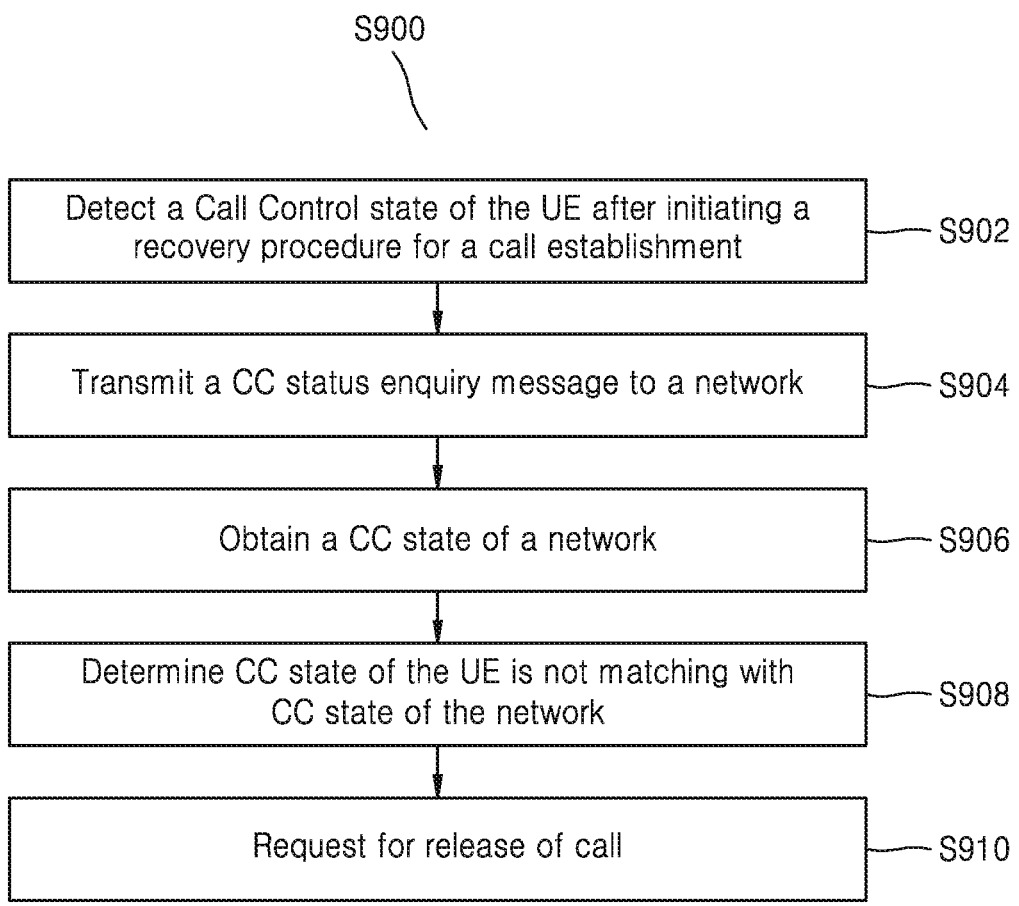
FIG. 6 is a flow diagram illustrating a method for managing the radio resource by the UE in the wireless communication network, according to some example embodiments as disclosed herein.

FIG. 6 is a flow diagram S900 illustrating a method for managing the radio resource by the UE 100 in the wireless communication network 1000, according to some example embodiments as disclosed herein.

At S902, the method includes detecting the CC state of the UE 100 after the recovery procedure for the call establishment. In some example embodiments, the method allows the CC state detector 110a to detect the CC state of the UE 100 after the recovery procedure for the call establishment. At S904, the method includes transmitting the CC status enquiry message to the network 200. In some example embodiments, the method allows the CC status transmitter 110b to transmit the CC status enquiry message to the network 200. At S906, the method includes obtaining the CC state of the network 200. In some example embodiments, the method allows the CC state determiner 110c to obtain the CC state of the network 200 based on a received CC status message from the network 200.

At S908, the method includes determining that the CC state of the UE 100 does not match with the CC state of the network 200. In some example embodiments, the method allows the CC state determiner 110c to determine whether the CC state of the UE 100 matches with the CC state of the network 200.

If the CC state of the UE 100 does not match with CC state of the network 200, at S910, the method includes the UE 100 releasing the call. In some example embodiments, the method allows the CC state updater 110d to release the call.

In some example embodiments, if the CC state of the UE 100 is not matched with CC state of the network 200, at S912, the method includes updating the CC state corresponding to the determined CC state of the network 200. In some example embodiments, the method allows the CC state updater 110d to update the CC state corresponding to the determined CC state of the network 200. At S914, the method includes establishing the call. In some example embodiments, the method allows the CC state updater 110d to establish the call.

The proposed method may be used to conserve the radio resources by releasing the call early instead of waiting for the timer (e.g., NAS T310/T303) to expire. With the early call release, instead of the user of the UE 100 being in the dialing state, the network 200 releases the resources corresponding to call, notifying the user of the UE 100 that the call is not connected, providing the user with the opportunity to redial the call. Therefore, the user's experience is improved by reducing delay in completing the call.

The various actions, acts, blocks, operations, or the like in the flow diagram S900 may be performed in the order presented, in a different order or contemporaneously. Further, in some example embodiments, some of the actions, acts, blocks, operations, or the like may be omitted, added, modified, skipped, or the like without departing from the scope of the example embodiments.

Figure 7:
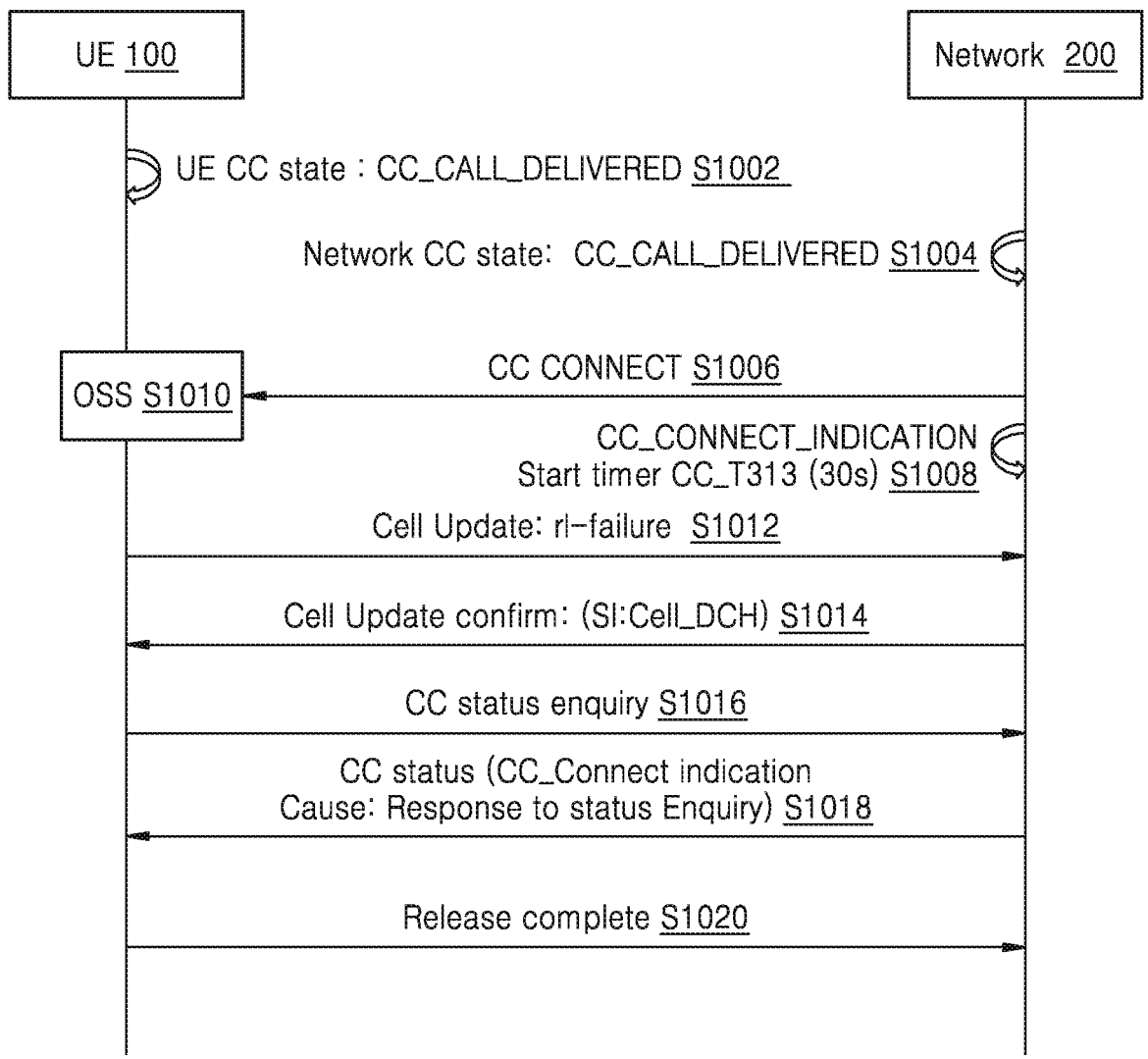
FIG. 7 is sequential flow diagram illustrating a release of a failed call to conserve radio resources, according to some example embodiments as disclosed herein.

FIG. 7 is sequential flow diagram illustrating a release of the CS call to conserve the radio resource, according to some example embodiments as disclosed herein.

In this scenario, during the MO call setup time, after the radio bearer setup is completed, the UE 100 CC state is in the CC_CALL_DELIVERED state at S1002 and the network 200 CC state is in the CC_CALL_DELIVERED state at S1004. At S1006, the network 200 sends the CC CONNECT message to the UE 100. At S1008, the network 200 starts the timer 250 (e.g., CC_T313 for 30 seconds). At S1010, the UE 100 moves to the Out of synchronization/Out of Service (OOS) state and a NAS T310/T303 timer starts running at the UE 100. The UE 100 is unable to receive the connect message due to the OOS state.

At S1012, the UE 100 sends the cell update message (e.g., Cell Update: rl-failure message) to the network 200. Based on the cell update message, the network 200 sends the cell update confirm message (e.g., SI:Cell_DCH) to the UE 100 at S1014.

Referring back to S1006 and S1008, since the network 200 (e.g., the MSC) has triggered the CC CONNECT message, the network 200 CC state at the MSC changes to CC_CONNECT_INDICATION from the CC_CALL_DELIVERED and the timer 250 (e.g., CC_T313 for 30 seconds) starts. Following S1008, both the UE 100 and the network 200 are waiting for the each other to respond. (e.g., UE 100 is waiting for the CC CONNECT message from the network 200 and the network 200 is waiting for the CONNECT ACK message from the UE 100).

In conventional methods and systems, after the recovery from the OOS, the UE 100 is in a back in service and waiting for a call control (CC) connect message state. When a timer (e.g., NAS T310 timer) expires without the UE 100 having received the CC connect message from the network 200, the UE 100 sends a disconnect message to the network 200. Based on the disconnect message, the call setup fails and the radio resources corresponding to the call will be released after the timer expiry either at the network 200 or at the UE 100. This results in a negative user experience due to excessive delay in waiting for the call to be connected, and excessive wastage of the radio resources.

However, according to some example embodiments, after the recovery from the OOS, the UE 100 sends the STATUS ENQUIRY message to determine the network's CC state at S1016. According to some example embodiments, the below conditions may be used by the UE 100 for determining when to trigger the STATUS ENQUIRY message:

1. UE 100 CC state: CC_CALL_DELIVERED,
2. Radio Bearer Resources are allocated, and
3. Recovery from the OOS with a RRC state as CELL_DCH is performed, and CS bearers are not released.

Based on the cell update confirm message, the UE 100 sends the CC status enquiry to the network 200. The network 200 sends the CC status (e.g., CC_Connect indication Cause: Response to status Enquiry) message to the UE 100 at S1018. At 1020, based on the received CC status, the UE 100 determines that the UE 100 CC state (e.g., CC_CALL_DELIVERED) does not match the network 200 CC state (e.g., CC_CONNECT_INDICATION). Accordingly, the UE 100 releases the radio resources and sends the resource release complete message to the network 200 (e.g., if the network's CC_STATE is CC_CONNECT_INDICATION which confirms that the network 200 sent the CONNECT message to the UE 100, then the UE 100 sends the release complete message with the CC Cause: Temporary Failure to the network).

The proposed method may be used to conserve the radio resources by releasing the call early instead of waiting for the timer (e.g., NAS T310/T303) to expire. Accordingly, instead of the user of the UE 100 remaining in a dialing state, the network 200 releases the resources corresponding to the call, notifying the user of the UE 100 that the call is not connected, providing the user with the opportunity to redial the call. Therefore, the user's experience is improved by reducing delay in completing the call. In case of a Dual Subscriber Identity Module (SIM) Dual Stand-by (DSDS) UE, a stack other than the stack attempting to perform he call may use radio frequency (RF) resources after the call is released without the additional delay of waiting for the timer to expire.

Figure 8:
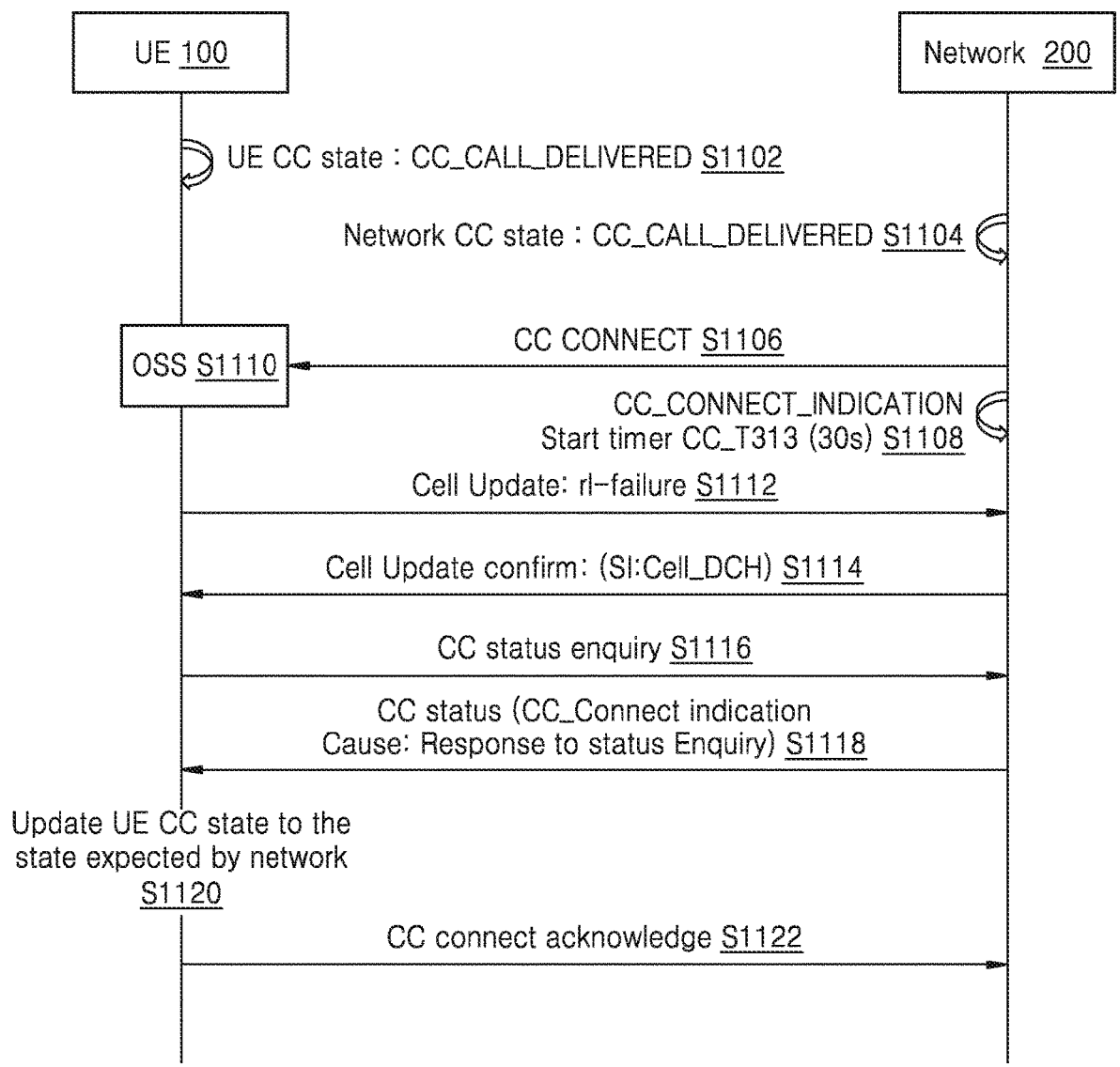
FIG. 8 is sequential flow diagram illustrating various operations, performed by the UE, for establishment of a call during a radio link failure, according to some example embodiments as disclosed herein.

FIG. 8 is sequential flow diagram illustrating various operations, performed by the UE 100, for establishment of the call during the radio link failure, according to some example embodiments as disclosed herein.

In this scenario, the UE 100 CC state is in the CC_CALL_DELIVERED state at S1102 and the network 200 CC state is in the CC_CALL_DELIVERED state at S1104. At S1106, the network 200 sends the CC CONNECT message to the UE 100. At S1108, the network 200 starts the timer 250 (e.g., CC_T313 for 30 seconds).

At S1110, the UE 100 moves to the OOS state and the NAS T310/T303 timer starts running at the UE 100. The UE 100 is unable to receive the connect message due to the OOS state. At S1112, the UE 100 sends the call update message (e.g., Cell Update: rl-failure message) to the network 200. Based on the call update message, the network 200 sends the cell update confirm message (e.g., SI:Cell_DCH) to the UE 100 at S1114.

After the recovery from the OOS, the UE 100 sends the STATUS ENQUIRY message to determine the network's CC State at S1116. According to some example embodiments, the below conditions may be used by the UE 100 for determining when to trigger the STATUS ENQUIRY message:

1. UE 100 CC state is CC_CALL_DELIVERED,
2. Radio Access Bearer Resources are allocated, and
3. Recovery from OOS with RRC state as CELL_DCH is performed, and CS bearers are not released.

Based on the Cell Update confirm message, the UE 100 sends the CC status enquiry to the network 200. At S1118, the network 200 sends the CC status (e.g., CC_Connect indication Cause: Response to status Enquiry) message to the UE 100. At S1120, based on the received CC status, the UE 100 determines that the UE 100 CC state (e.g., CC_CALL_DELIVERED) does not match the network 200 CC state (e.g., CC_CONNECT_INDICATION). Accordingly, the UE 100 updates the UE 100 CC state to match the CC state expected by the network 200 (e.g., as if CC_CONNECT was received from the network 200). The UE 100 sends the CC connect acknowledgement message to the network 200 at S1122.

In some example embodiments, with reference to S1118, if the CC status message from the network 200 indicates that the CC_STATE of the network 200 corresponds to the CC_CONNECT_INDICATION state, the UE 100 determines that the network 200 sent the CONNECT message to the UE 100 in S1106, and thus, the UE 100 CC state (e.g., CC_CALL_DELIVERED) does not match the network 200 CC state (e.g., CC_CONNECT_INDICATION). With the confirmation of the CC state change at the network 200, the UE 100 will change the UE 100 CC state to be compatible with (e.g., match) the CC state of the network 200. In accordance with the changed UE 100 CC state, the UE 100 sends the CC_CONNECT_ACK message (e.g., CC Connect Acknowledgement message) to the network 200.

In some example embodiments, with reference to S1118, if the CC status message from the network 200 indicates that the CC_STATE of the network 200 corresponds to the CC_DISCONNECT_INDICATION state, the UE 100 determines that the network 200 sent a DISCONNECT message to the UE 100, and thus, the UE 100 CC state (e.g., CC_CALL_DELIVERED) does not match the network 200 CC state (e.g., CC_DISCONNECT_INDICATION). Accordingly, the UE 100 will change the UE 100 CC state to be compatible with (e.g., match) the CC state of the network 200. In accordance with the changed UE 100 CC state, the UE 100 sends a RELEASECOMPLETE message to the network 200. According to some example embodiments, similarly appropriate action will be taken as per 3GPP specifications, if there is any other CC state mismatch between the UE 100 and the network 200.

Figure 9:
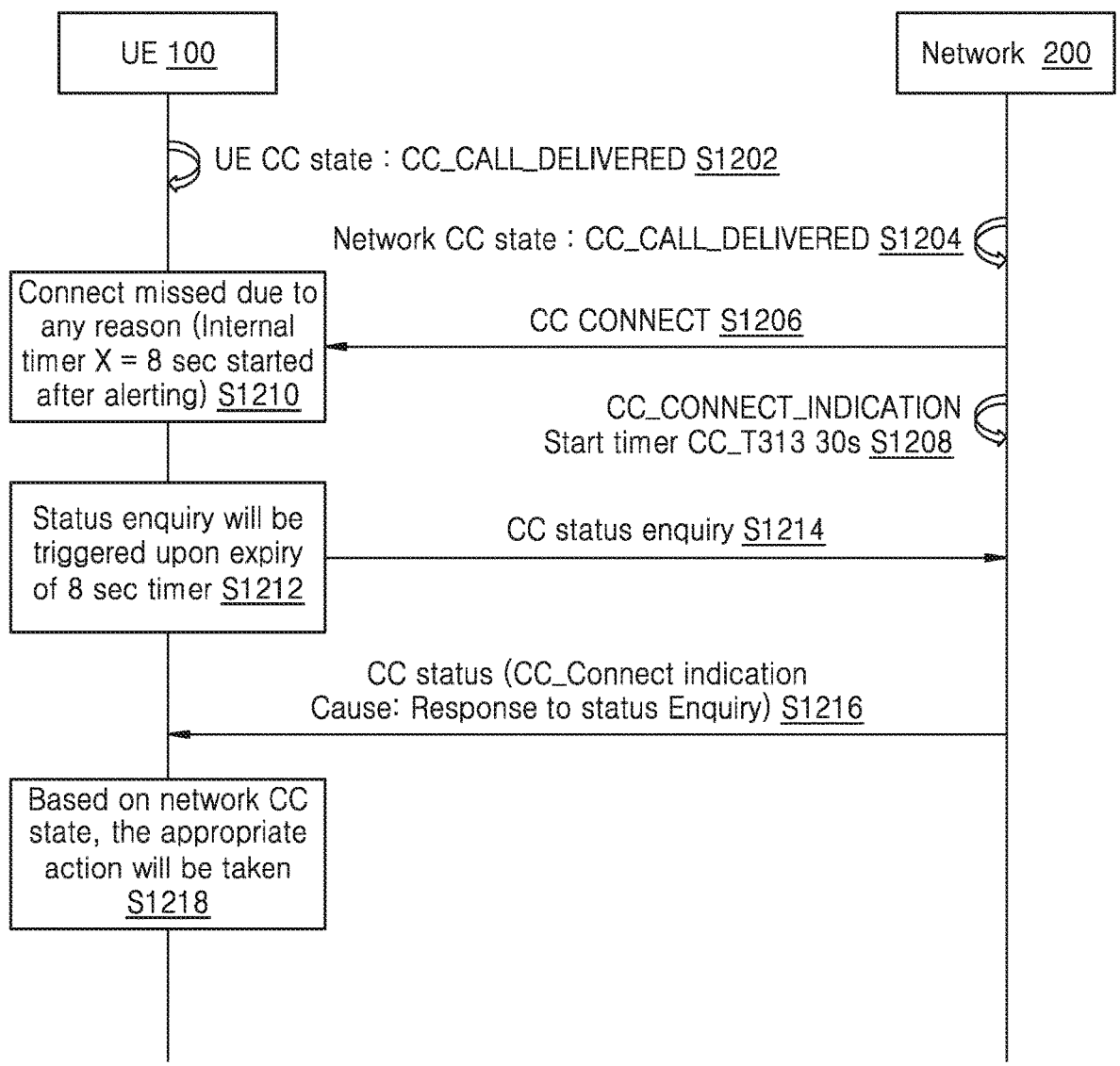
FIG. 9 is sequential flow diagram illustrating various operations, performed by the UE, for establishment of a call, according to some example embodiments as disclosed herein. The procedure is applicable for both $2^{nd}$ Generation (2G) and $3^{rd}$ Generation (3G) networks.

FIG. 9 is sequential flow diagram illustrating various operations, performed by the UE 100, for establishment of the call, according to some example embodiments as disclosed herein. The operations are applicable for both 2G and 3G networks.

In this scenario, the UE 100 CC state is in the CC_CALL_DELIVERED state at S1202 and the network 200 CC state is in the CC_CALL_DELIVERED state at S1204. The network 200 sends the CC connect message to the UE 100 at S1206 and the network 200 starts the timer 250 (e.g., CC_T313 for 30 seconds) at S1208. The UE 100 does not receive the CC connect message due to any reason (e.g., OSS state) and the UE 100 starts an internal timer for the threshold value (in an example, the threshold value is 8 seconds) at S1210. The status enquiry will be triggered by the UE 100 upon expiry of the timer at S1212. The UE 100 sends the CC status enquiry message to the network 200 at S1214. The network 200 sends the CC status (e.g., CC_Connect indication Cause: Response to status Enquiry) message to the UE 100 at S1216. Based on the CC status, the UE 100 performs the action (e.g., releasing the radio resources or establishing the call) at S1218.

In some example embodiments, the threshold value of the internal timer is defined by an external source (e.g., a user). Then, in S1212, the UE 100 waits for the threshold value of the internal timer (defined by the user) to expire before triggering status enquiry message to the network 200 in S1214. Based on network's CC state determined from the CC status message received by the UE 100 in S1216, the UE 100 proceeds with further action in S1218.

In some example embodiments, if the CC status message sent in S1216 indicates that the CC_STATE of the network 200 corresponds to a CC_CONNECT_INDICATION, the UE 100 determines that the network 200 sent the CONNECT message to the UE 100 in S1206, and thus, the UE 100 CC state (e.g., CC_CALL_DELIVERED) does not match the network 200 CC state (e.g., CC_CONNECT_INDICATION). With the confirmation of CC state change at the network 200, the UE 100 will change the UE 100 CC state to be compatible with (e.g., match) the CC state of the network 200. In accordance with the changed UE 100 CC state, the UE 100 sends the CC_CONNECT_ACK message to the network 200.

In some example embodiments, if the CC status message sent in S1216 indicates that the CC_STATE of the network 200 corresponds to a CC_DISCONNECT_INDICATION, the UE 100 determines that the network sent a DISCONNECT message to the UE 100, and thus, the UE 100 CC state (e.g., CC_CALL_DELIVERED) does not match the network 200 CC state (e.g., CC_DISCONNECT_INDICATION). Accordingly, the UE 100 will change the UE 100 CC state to be compatible with (e.g., match) the CC state of the network 200. In accordance with the changed UE 100 CC state, then the UE 100 sends a RELEASECOMPLETE message to the network 200.

In some example embodiments, if the CC status message sent in S1216 indicates that the CC_STATE of the network 200 corresponds to a CALL_DELIVERED state, the UE 100 will wait for a CONNECT message from the network 200 because UE 100 CC state matches the network 200 CC state.

In some example embodiments, similarly appropriate action will be taken as per the 3GPP specifications, if there is any other CC state mismatch between the UE 100 and the network 200.

Figure 10:
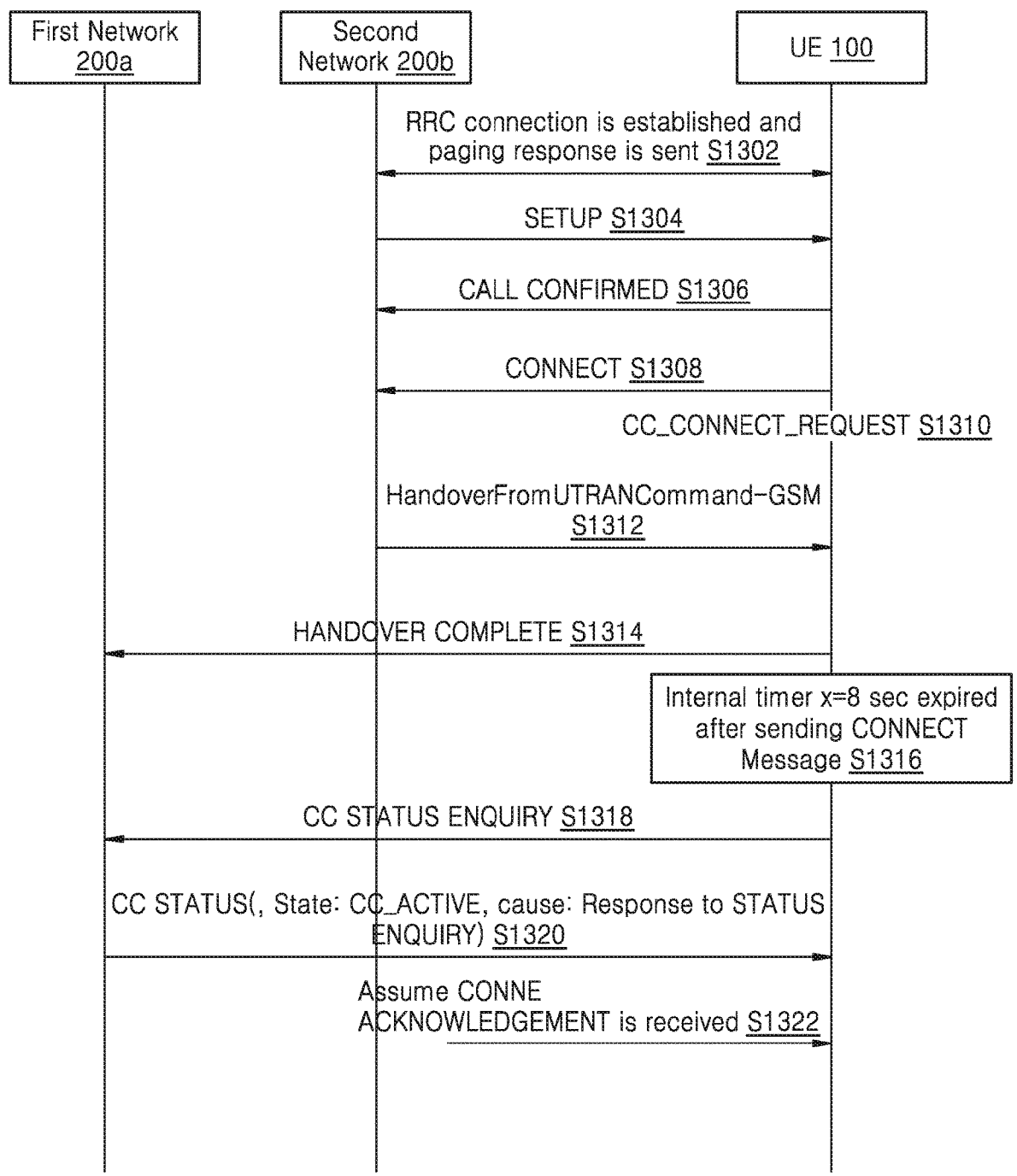
FIG. 10 is sequential flow diagram illustrating various operations, performed by the UE, establishment of a call during a 3G to 2G handover, according to some example embodiments as disclosed herein.

FIG. 10 is sequential flow diagram illustrating various operations, performed by the UE 100, for establishment of a call during a 3G to 2G handover, according to some example embodiments as disclosed herein.

At S1302, a RRC connection is established and a paging response is sent to the UE 100 from a second network 200*b* (e.g., 3G network). At S1304, the second network 200*b* sends a call setup message to the UE 100. At S1306, the UE 100 sends a call confirmed message to the second network 200*b*. At S1308, the UE 100 sends a call connect message to the second network 200*b*. At S1310, the UE 100 is in a CC_CONNECT_REQUEST state. At S1312, the second network 200*b* sends a handoverFromUTRANCommandGSM to the UE 100. At S1314, the UE 100 sends a handover complete message to a first network 200*a* (e.g., the 2G network).

In conventional methods and systems, if a connect acknowledgement message is sent to the UE 100 by the second network 200*b* during the handover from the second network 200*b* to the first network 200*a*, the call setup will fail and the radio resources corresponding to the call will be released after the timer expiry either at the network 200 or at the UE 100. This results in a negative user experience due to excessive delay in waiting for the call to be connected, and excessive wastage of the radio resources.

However, according to some example embodiments, at S1316, after sending the handover complete message to the first network 200*a*, the UE 100 starts an internal timer that expires at specified threshold value (e.g., 8 seconds). After the internal timer expires, the UE 100 sends a CC status enquiry message to the first network 200*a* at S1318. At S1320, the first network 200*a* sends the CC status message (e.g., CC_Connect indication Cause: Response to status Enquiry) to the UE 100. At S1312, based on the received CC status message, the UE 100 responds as if (e.g., assumes) the connect acknowledgement were received from the second network 200*b*.

In some example embodiments, when the connect acknowledgement message is missed at the UE 100 due to the handover from 3G network to 2G network, after the connect message is sent to the second network 200*b*, the UE 100 will start the timer with threshold value (in an example, the threshold value is 8 seconds). Upon the expiry of the timer, the UE 100 will send a STATUS ENQUIRY message to the 2G network (e.g., the first network 200*a*). The 2G network responds with STATUS message with the CC state as ACTIVE state. Further, if the CC STATE at the network side is the CC_ACTIVE state and the UE 100 CC state is the CC_CONNECT_REQUEST state, the UE 100 responds as if the missed CONNECT ACKNOWLEDGE message were received from the second network 200b.

Figure 11:
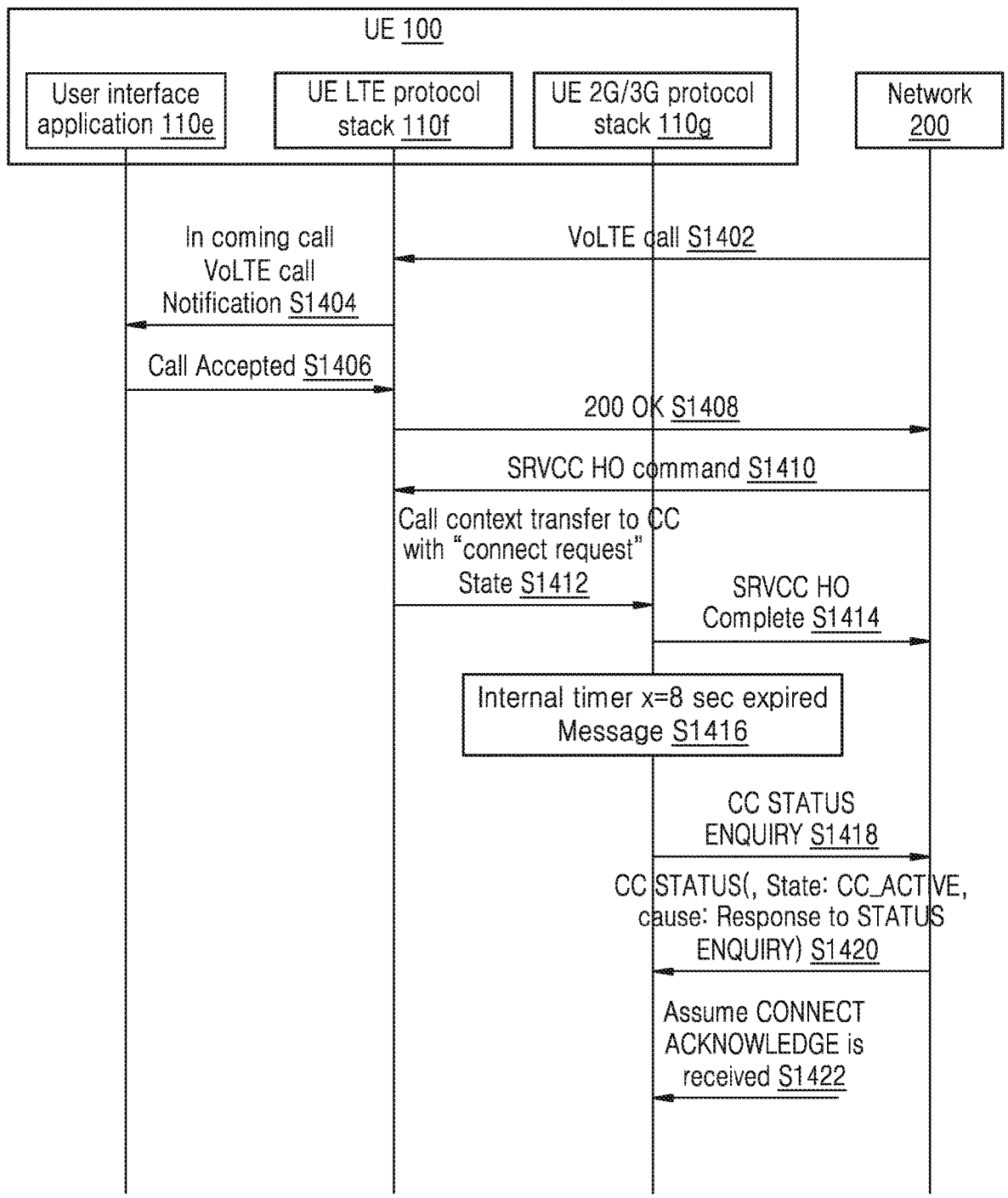
FIG. 11 is sequential flow diagram illustrating various operations, performed by the UE, establishment of a call, during a SRVCC handover from a LTE network to a 3G/2G network, according to some example embodiments as disclosed herein.

FIG. 11 is sequential flow diagram illustrating various operations, performed by the UE 100, for establishment of a call, during a SRVCC handover from a LTE network to a 3G/2G network, according to some example embodiments as disclosed herein.

At S1402, the network 200 sends a VoLTE call message to the UE LTE protocol stack 110f. At S1404, the UE LTE protocol stack 110f sends an incoming call VoLTE call notification message to the user interface (UI) application 110e. At S1406, the user interface application 110e sends a call accepted message to the UE LTE protocol stack 110f. At S1408, the UE LTE protocol stack 110f sends a message (e.g., a 200 ok message) to the network 200. At S1410, the network 200 sends a SRVCC HO command to the UE LTE protocol stack 110f.

In conventional methods and systems, after the network 200 sends the SRVCC HO commend to the UE LTE protocol stack, the UE LTE protocol stack sends a "call context transfer to CC with an alerting state" message to a UE 2G/3G protocol stack. The network 200 sends an acknowledgement message, but the UE 100 does not receive the acknowledgement message due to the HO procedure. Then, the UE 2G/3G protocol stack sends the SRVCC HO complete message to the network 200. At this juncture, the UE 100 CC state is in an alerting state and the network 200 CC state is an active state. But, in the network 200, after the UE 100 sends the SRVCC HO complete message, a Proxy-Call Session Control Function (P-CSCF) entity provides a MO call context to a Mobile Switching Centre (MSC) (e.g., the network 200) with the CC CONNECT state, resulting in a call context mismatch between the UE 100 and the network 200. Since the UE 100 does not receive the acknowledgement message, the call setup will fail and the resource corresponding to the call will be released after the timer expiry either at the network 200 or at the UE 100. This results in a negative user experience due to excessive delay in waiting for the call to be connected, and excessive wastage of the radio resources.

However, in some example embodiments, at S1412, the UE LTE protocol stack 110f sends a call context transfer message including CC with connect request state to the UE 2G/3G protocol stack 110g. At S1414, the UE 2G/3G protocol stack 110g sends a SRVCC HO complete message to the network. At S1416, the UE 2G/3G protocol stack 110g starts an internal timer of a specified duration (e.g., 8 seconds) and the UE 2G/3G protocol stack 110g sends a CC status enquiry message to the network 200 at S1418. The network 200 sends a CC status message (e.g., CC_Connect indication Cause: Response to status Enquiry) to the UE 100 at S1420. At S1422, based on the CC status message, the UE 100 responds as if the connect acknowledgement were received from the network 200.

In some example embodiments, the UE 100 will start the timer for the threshold value (in an example, the threshold value is 8 seconds), and once the timer expires, the UE 100 will request the CC state of the network 200. The UE 100 sends the status enquiry message to the 2G/3G network 200. The network 200 responds with the STATUS message with CC state as ACTIVE. In this case, if the CC STATE at the network 200 is CC_ACTIVE and the UE 100 if it is CC_CONNECT_REQUEST (indicating that the UE 100 is still at an alerting phase) then the UE 100 responds as if the connect acknowledge message were received from the network 200.

While some example embodiments relate to call establishment during handovers between specific types of networks, some example embodiments may relate to call establishment during handovers between other types of networks.

The example embodiments disclosed herein may be implemented using at least one software program running on at least one hardware device and performing network management functions to control the elements.

The various operations of methods described above may be performed by any suitable means capable of performing the operations, such as various hardware and/or software implemented in some form of hardware (e.g., processor, ASIC, etc.).

The software may comprise an ordered listing of executable instructions for implementing logical functions, and can be embodied in any "processor-readable medium" for use by or in connection with an instruction execution system, apparatus, or device, such as a single or multiple-core processor or processor-containing system.

The blocks or steps of a method or algorithm and functions described in connection with the example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The foregoing description of the some example embodiments will so fully reveal the general nature of the example embodiments herein that others can, by applying current knowledge, readily modify and/or adapt for various applications such some example embodiments without departing from the generic concepts, and, therefore, such adaptations and modifications should and are intended to be comprehended within the meaning and range of equivalents of the example embodiments. It is to be understood that the phraseology or terminology employed herein is for the purpose of description and not of limitation. Therefore, while some example embodiments herein have been described, those skilled in the art will recognize that some example embodiments herein can be practiced with modification within the spirit and scope of the example embodiments as described herein.

We claim:

1. A method performed by a user equipment (UE) for establishing a call in a wireless communication network, the method comprising:
   determining a first call control (CC) state of the UE after a recovery procedure for a call establishment is performed;
   sending a CC status enquiry message to a first base station connected to a first network;
   determining a second CC state of the first base station from a CC status message received from the first base station in response to the CC status enquiry message;
   establishing the call by updating the first CC state based on the determined second CC state;
   determining that a mismatch occurs between the first CC state and the second CC state based on the CC status message; and
   releasing a radio resource in response to the determining that the mismatch occurs.

2. The method of claim 1, wherein the establishing the call comprises sending a CC connect acknowledgement message to the first base station.

3. The method of claim 2, wherein the CC connect acknowledgement message corresponds to a CC connect message sent by the first base station, and the sending sends the CC connect acknowledgement message without the UE having received the CC connect message.

4. The method of claim 1, wherein the sending sends the CC status enquiry message to the first base station after a defined time interval.

5. The method of claim 1, further comprising:
receiving a handover command message from a second base station after sending a connect message to the second base station for establishment of the call while connected to a second network via the second base station; and
sending a handover complete message to the first base station after performing a handover,
wherein the sending the CC status enquiry message sends the CC status enquiry message to the first base station after a defined time interval.

6. The method of claim 1, further comprising:
receiving a Single Radio Voice Call Continuity (SRVCC) handover command message from a second base station during establishment of a Voice over Long Term Evolution (VoLTE) call; and
sending a SRVCC handover complete message to the first base station after performing a handover,
wherein the sending the CC status enquiry message sends the CC status enquiry message to the first base station after a defined time interval.

7. The method of claim 1, wherein the first CC state and the second CC state both correspond to establishment of the call.

8. A user equipment (UE) for establishing a call in a wireless communication network, comprising:
a memory storing computer-readable instructions; and
at least one processor coupled to the memory and configured to execute the computer-readable instructions to,
determine a first call control (CC) state of the UE after a recovery procedure for a call establishment is performed,
send a CC status enquiry message to a first base station connected to a first network,
determine a second CC state of the first base station from a CC status message received from the first base station in response to the CC status enquiry message,
establish the call by updating the first CC state based on the determined second CC state,
determine that a mismatch occurs between the first CC state and the second CC state based on the CC status message, and
release a radio resource in response to the determination that the mismatch occurs.

9. The UE of claim 8, wherein the at least one processor is configured to execute the computer-readable instructions to establish the call comprises sending a CC connect acknowledgement message to the first base station.

10. The UE of claim 8, wherein the at least one processor is configured to execute the computer-readable instructions to send the CC status enquiry message to the first base station after a defined time interval.

11. The UE of claim 8, wherein the at least one processor is configured to execute the computer-readable instructions to:
receive a handover command message from a second base station after sending a connect message to the second base station for establishment of the call while connected to a second network via the second base station;
send a handover complete message to the first base station after performing a handover; and
send the CC status enquiry message to the first base station after a defined time interval.

12. The UE of claim 8, wherein the at least one processor is configured to execute the computer-readable instructions to:
receive a Single Radio Voice Call Continuity (SRVCC) handover command message from a second base station during establishment of a Voice over Long Term Evolution (VoLTE) call;
send a SRVCC handover complete message to the first base station after performing a handover; and
sending the CC status enquiry message to the first base station after a defined time interval.

13. A non-transitory computer-readable medium storing computer-readable instructions that, when executed by at least one processor, cause the at least one processor to:
determine a first call control (CC) state of a user equipment (UE) after a recovery procedure for a call establishment is performed;
send a CC status enquiry message to a first base station connected to a first network;
determine a second CC state of the first base station from a CC status message received from the first base station in response to the CC status enquiry message;
establish a call by updating the first CC state based on the determined second CC state;
receive a handover command message from a second base station after sending a connect message to the second base station for establishment of the call while connected to a second network via the second base station;
send a handover complete message to the first base station after performing a handover; and
send the CC status enquiry message to the first base station after a defined time interval.

14. The non-transitory computer-readable medium of claim 13, wherein the computer-readable instructions, when executed by the at least one processor, cause the at least one processor to establish the call comprises sending a CC connect acknowledgement message to the first base station.

15. The non-transitory computer-readable medium of claim 13, wherein the computer-readable instructions, when executed by the at least one processor, cause the at least one processor to send the CC status enquiry message to the first base station after a defined time interval.

16. The non-transitory computer-readable medium of claim 13, wherein the computer-readable instructions, when executed by the at least one processor, cause the at least one processor to:
determine that a mismatch occurs between the first CC state and the second CC state based on the CC status message; and
release a radio resource in response to the determination that the mismatch occurs.

17. The non-transitory computer-readable medium of claim 13, wherein the computer-readable instructions, when executed by the at least one processor, cause the at least one processor to:

receive a Single Radio Voice Call Continuity (SRVCC) handover command message from a second base station during establishment of a Voice over Long Term Evolution (VoLTE) call;

send a SRVCC handover complete message to the first base station after performing a handover; and sending the CC status enquiry message to the first base station after a defined time interval.

* * * * *